US010423808B2

(12) United States Patent
Vichik et al.

(10) Patent No.: US 10,423,808 B2
(45) Date of Patent: Sep. 24, 2019

(54) METHOD AND APPARATUS FOR SOLVING AN OPTIMIZATION PROBLEM USING AN ANALOG CIRCUIT

(71) Applicant: THE REGENTS OF THE UNIVERSITY OF CALIFORNIA, Oakland, CA (US)

(72) Inventors: Sergey Vichik, Albany, CA (US); Francesco Borrelli, Kensington, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1092 days.

(21) Appl. No.: 14/811,791

(22) Filed: Jul. 28, 2015

(65) Prior Publication Data

US 2016/0026830 A1 Jan. 28, 2016

Related U.S. Application Data

(63) Continuation of application No. PCT/US2014/014292, filed on Jan. 31, 2014.

(60) Provisional application No. 61/758,821, filed on Jan. 31, 2013.

(51) Int. Cl.

| | |
|---|---|
| ***G06F 17/10*** | (2006.01) |
| ***G06G 7/122*** | (2006.01) |

(52) U.S. Cl.

CPC .................................... *G06G 7/122* (2013.01)

(58) Field of Classification Search

CPC ...................................................... G06G 7/122

USPC ................................................ 703/2, 13, 14

See application file for complete search history.

(56) References Cited

U.S. PATENT DOCUMENTS

| | | | | |
|---|---|---|---|---|
| 3,628,001 | A | 12/1971 | Niblock et al. | |
| 6,266,787 | B1 * | 7/2001 | McDermid | G01R 31/27 702/120 |
| 7,237,214 | B1 * | 6/2007 | Pandey | G06F 17/5072 716/131 |
| 8,423,946 | B1 * | 4/2013 | Jin | G06F 17/5045 716/126 |
| 2012/0271528 | A1 | 10/2012 | Pekar et al. | |

OTHER PUBLICATIONS

Korean Intellectual Property Office (KIPO), International Search Report and Written Opinion, PCT International Application No. PCT/US2014/014292, dated Nov. 20, 2014, pp. 1-10, with claims searched, pp. 11-16, counterpart to U.S. Appl. No. 14/811,791 herein.

(Continued)

*Primary Examiner* — Andre Pierre Louis

(74) *Attorney, Agent, or Firm* — O'Banion & Ritchey LLP; John P. O'Banion

(57) ABSTRACT

An analog circuit design is described that solves Linear Programming (LP) or Quadratic Programming (QP) problems.

20 Claims, 7 Drawing Sheets

(56) References Cited

OTHER PUBLICATIONS

Quero, J. M. et al., "Neural Network for Constrained Predictive Control," IEEE Transactions on Circuits and Systems—I: Fundamental Theory and Applications, Sep. 1993, pp. 621-626, vol. 40 No. 9.
Tank, David W et al., "Simple 'Neural' Optimization Networks: An A/D Converter, Signal Decision Circuit, and a Linear Programming Circuit", IEEE Transactions on Circuits and Systems, May 1986, pp. 533-541, vol. Cas-33, No. 5.
Kennedy, Michael Peter et al., "Neural Networks for Nonlinear Programming", IEEE Transactions on Circuits and Systems, May 1988, pp. 554-562, vol. 35 No. 5.

* cited by examiner

METHOD AND APPARATUS FOR SOLVING AN OPTIMIZATION PROBLEM USING AN ANALOG CIRCUIT

This application is a 35 U.S.C. § 111(a) continuation of PCT international application number PCT/US2014/014292 filed on Jan. 31, 2014, incorporated herein by reference in its entirety, which claims priority to, and the benefit of, U.S. provisional patent application Ser. No. 61/758,821 filed on Jan. 31, 2013, incorporated herein by reference in its entirety. Priority is claimed to each of the foregoing applications.

The above-referenced PCT international application was published as PCT International Publication No. WO 2014/121138 on Aug. 7, 2014, which publication is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED IN A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to modeling of mathematical problems with analog electrical circuits, and more particularly to the modeling of Linear Programming (LP) problems, Quadratic Programming (QP) problems, and Model Predictive Control (MPC) problems with analog electrical circuits.

2. Description of Related Art

Analog circuits for solving optimization problems have been extensively studied in the past.

Renewed interest has stemmed from Model Predictive Control (MPC). In MPC, at each sampling time, starting at an initial current state, an open-loop optimal control problem is solved over a finite horizon. The optimal command signal is applied to the process only during the following sampling interval. At the next time step, a new optimal control problem based on new measurements of the state is solved over a shifted time horizon.

The optimal solution relies on a dynamic model of the process, respects input and output constraints, and minimizes a performance index. When the model is linear and the performance index is based on two-norm, one-norm, or ∞-norm, the resulting optimization problem can be cast as a linear programming (LP) problem or a quadratic programming (QP) problem, where the state enters the right hand side (rhs) of the constraints.

BRIEF SUMMARY OF THE INVENTION

An analog circuit design is described that solves Linear Programming (LP) or Quadratic Programming (QP) problems. In particular, the steady-state circuit voltages are the components of the LP or QP optimal solution. Construction of the analog modeling circuit is shown. The method uses an analog circuit to implement an LP or QP-based Model Predictive Controller. Both simulated and experimental results show the effectiveness of the invention. The invention is applicable for real time solution of an LP or QP problem, e.g. for a Model Predictive Control (MPC) application. The solution time depends on properties of the analog devices in use, and may be as low as a few nanoseconds. Relatively simple operational amplifier circuits are used to realize: 1) negative resistances used for enforcing equality constraints; and 2) perfect diodes used for enforcing inequality constraints.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only.

and a voltage source with a value of $$\frac{b}{\sum_{k=1}^{n}\frac{1}{R_k}}.$$

Figure 2:
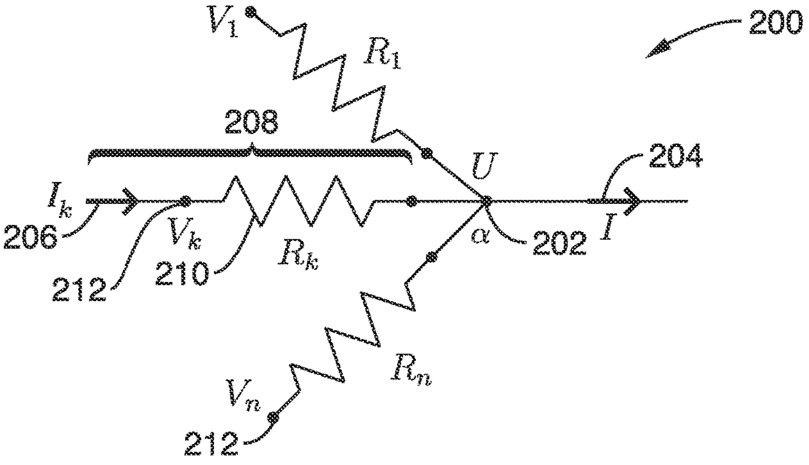

FIG. 2 is a schematic of a circuit illustrating Kirchhoff's Current Law (KCL), where 11 branches feed current $I_k$ ($i \in 1, \ldots, k, \ldots, n$) into a common node α that has a corresponding potential of U.

Figure 3:
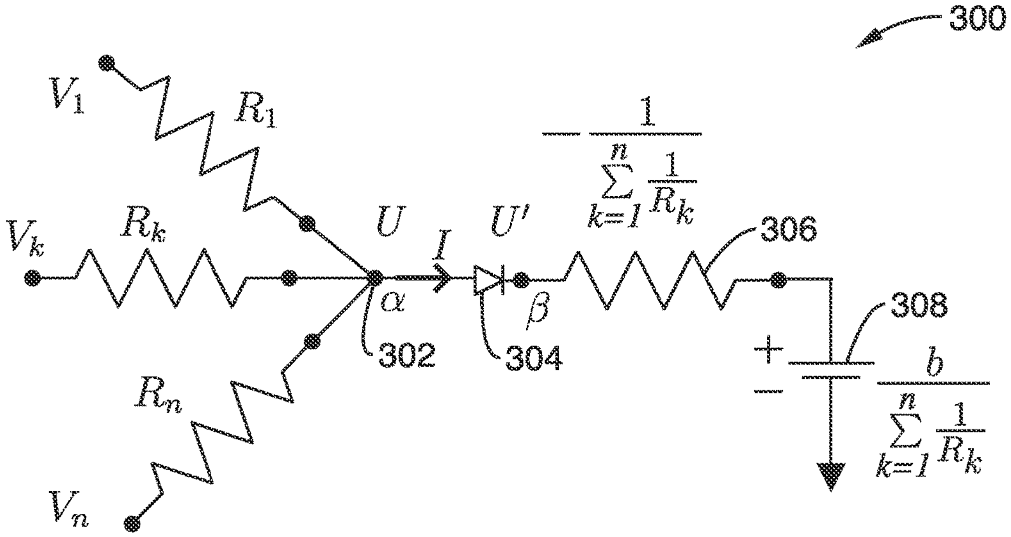

FIG. 3 is a schematic of an inequality enforcing circuit comprising 11 resistors ($R_1, \ldots, R_n$), a diode, a negative resistance that has a value of $$-\frac{1}{\sum_{k=1}^{n}\frac{1}{R_k}},$$

and a voltage source with a value of $$\frac{b}{\sum_{k=1}^{n} \frac{1}{R_k}}.$$

Figure 4:
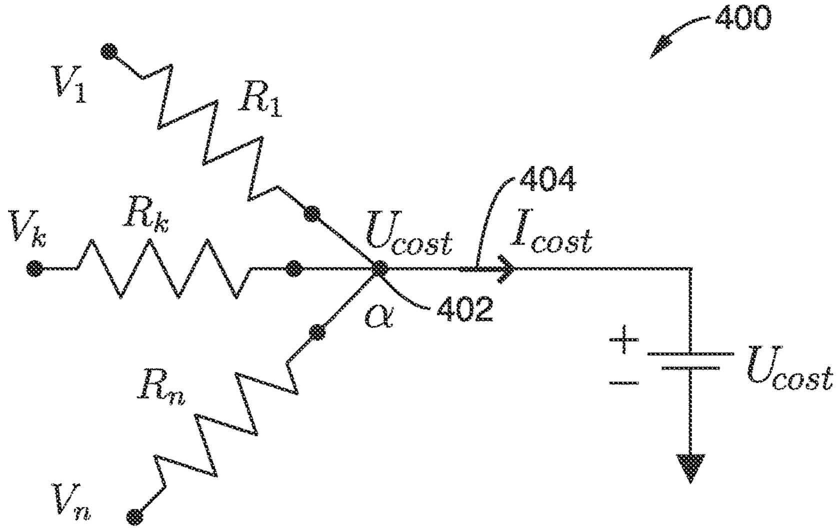

FIG. 4 is a schematic of a cost circuit that is connected to a cost voltage source.

Figure 5:
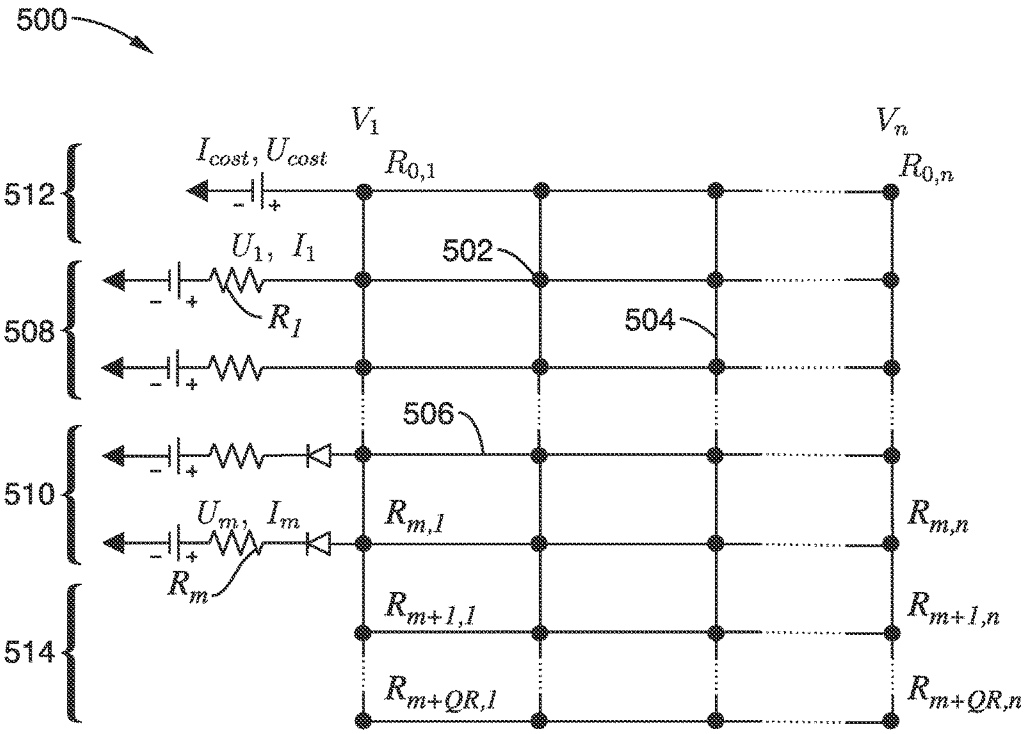

FIG. 5 is a schematic of an optimization lattice circuit designed for solving an optimization problem, where: 1) vertical conductors are variable nodes with potentials $V_1 \ldots V_n$; 2) horizontal conductors are cost or constraint nodes; 3) black dots represent resistances connecting vertical and horizontal conductors; 4) the topmost horizontal conductor is one cost circuit that is connected to a cost voltage source; and 5) quadratic cost resistors have been added to the bottom of the optimization lattice to allow for Quadratic Programming (QP) problem solution.

Figure 6A:
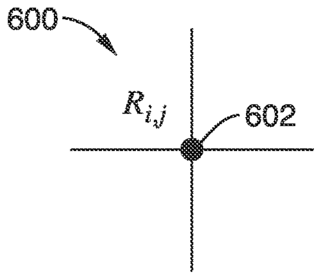

FIG. 6A is a schematic of one of the resistors R represented by a dot previously shown in FIG. 5.

Figure 6B:
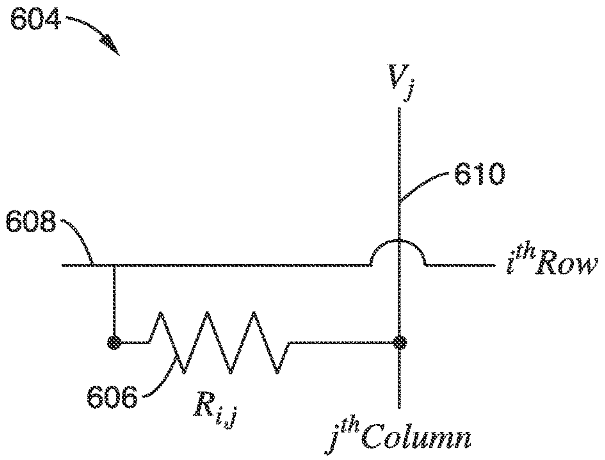

FIG. 6B is schematic of dot resistor R of FIG. 6A, where the compact representation of the resistor $R_{ij}$ is shown as a resistance of magnitude R interconnecting a horizontal $i^{th}$ row conductor, and a vertical $j^{th}$ column conductor.

Figure 7:
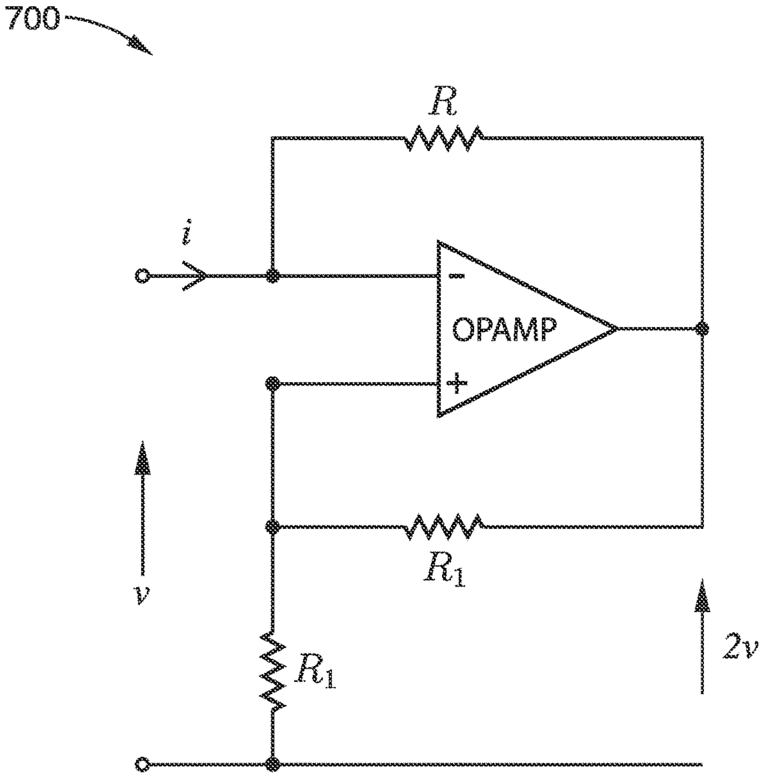
FIG. 7 (Prior Art)

FIG. 7 is a schematic of one prior art approximate implementation of a negative resistor, where an operational amplifier is used to provide feedback to approximate a negative resistor.

Figure 8A:
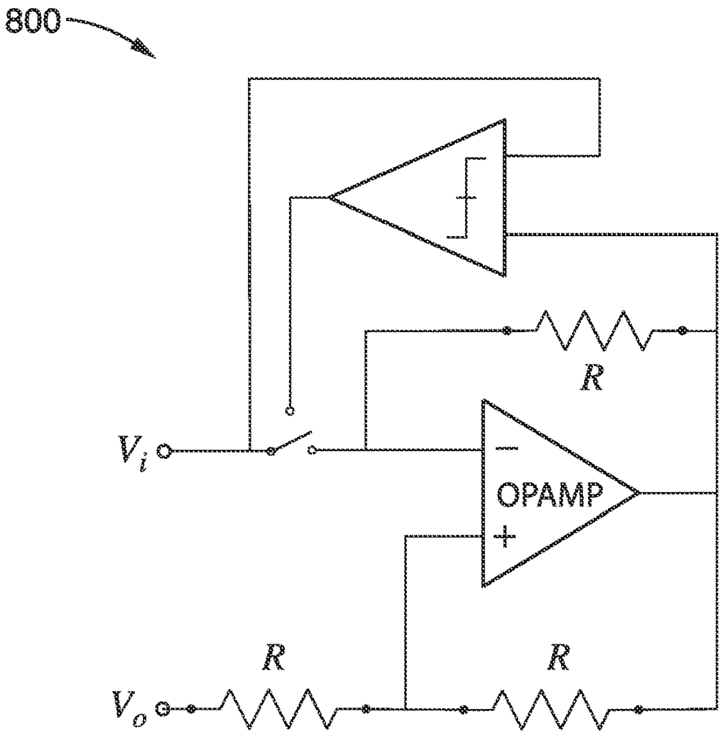
FIG. 8A (Prior Art)

FIG. 8A is a schematic of one prior art approximate implementation of a perfect diode, where an operational amplifier uses feedback and a comparator controlled switch to eliminate the band gap normally present in single component diodes, thereby approximating an ideal diode.

Figure 8B:
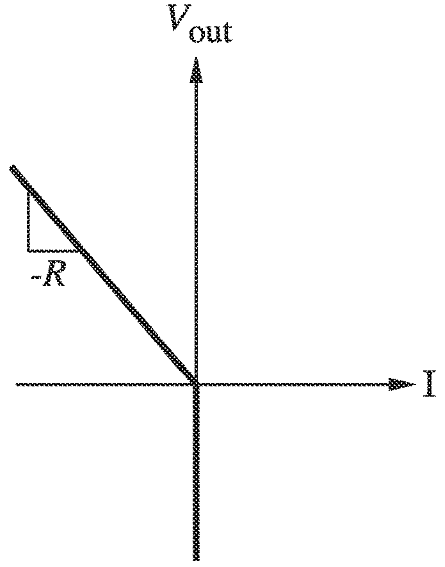
FIG. 8B (Prior Art)

FIG. 8B is a prior art graph of the output voltage versus the input voltage of the prior art approximate implementation of a perfect diode of FIG. 8A.

Figure 9A:
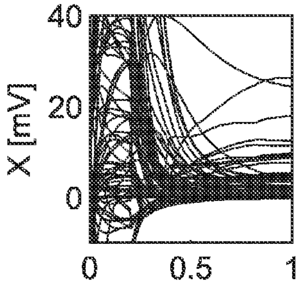

FIG. 9A is a graph of the solution to the QPCBLEND problem over a time scale of 0-1 μs, where the solutions are voltages corresponding to the problem unknowns.

Figure 9B:
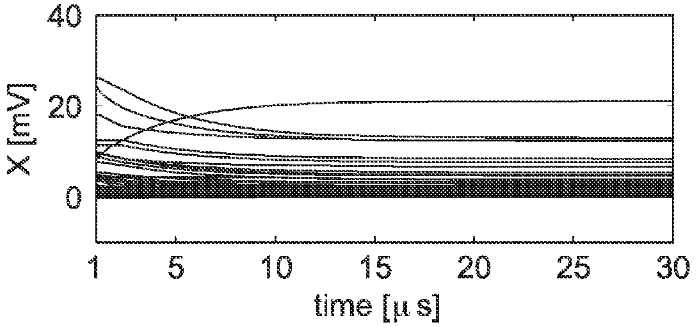

FIG. 9B is a graph of the solution to the QPCBLEND problem over a time scale of 1-30 μs, where the solutions are voltages corresponding to the problem unknowns.

Figure 9C:
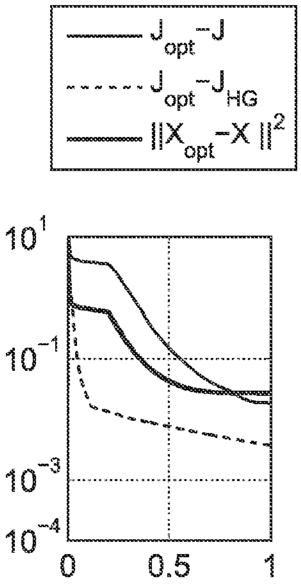

FIG. 9C is a graph of the error between the circuit cost and the optimal solution, and the norm of the solution error as a function of time, to the QPCBLEND problem over a time scale of 0-1 μs, with results shown for nominal and high gain bandwidth (GBW) operational amplifiers (denoted here as HG).

Figure 9D:
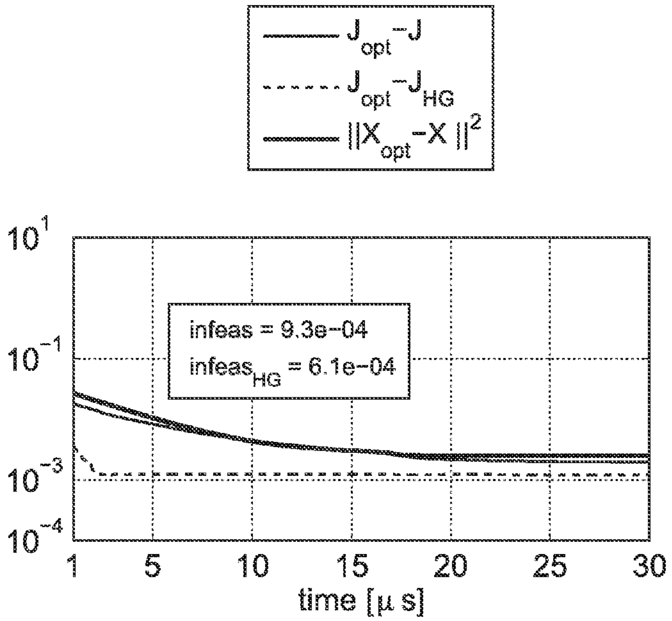

FIG. 9D is a graph of the error between the circuit cost and the optimal solution, and the norm of the solution error as a function of time, to the QPCBLEND problem over a time scale of 1-30 μs, with results shown for nominal and high gain bandwidth (GBW) operational amplifiers (denoted here as HG).

Figure 10:
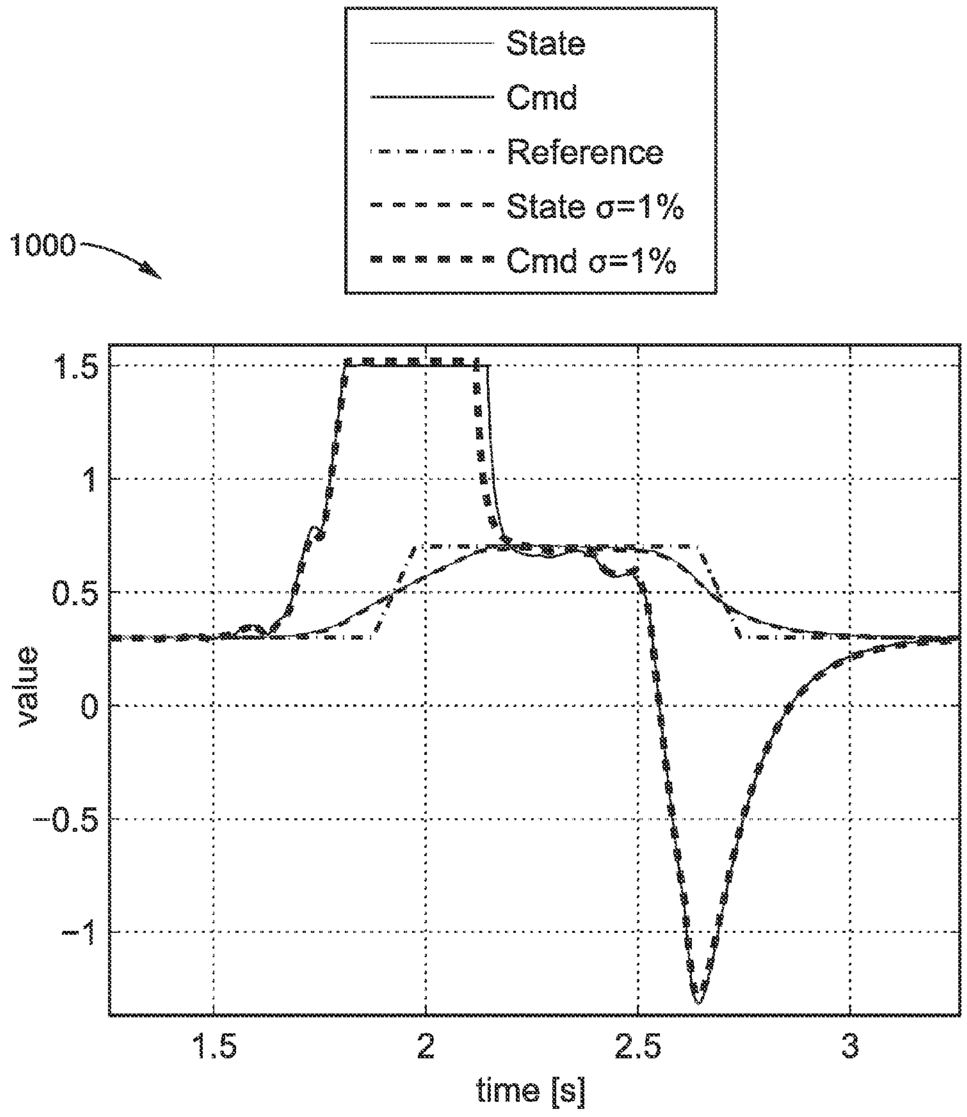

FIG. 10 is a graph of a Model Predictive Control (MPC) analog circuit implementation of a Linear Programming (LP) problem solution voltages, where solid lines represent the nominal controller, and dashed lines represent the controller implemented with 1% Gaussian random error analog devices.

DETAILED DESCRIPTION OF THE INVENTION

Introduction

The present invention teaches a design methodology of an analog optimization lattice electric circuit that has an equilibrium point that is the solution of a particular problem. Generally, the problem is an optimization problem. However, it may instead comprise a zero cost optimization, which is a solution of algebraic equality or inequality equations.

The problem solution is available after the settling time of the circuit. The settling time is usually much faster than corresponding digital computation time, and can be as low as a few nanoseconds. The method is potentially faster, and believed to be simpler, than any other presently known method.

The circuit may be used in any application where fast solutions of a series of similar problems are required and somewhat lower solution accuracy is tolerable. Examples include, but are not limited to:

(a) Model Predictive Control (MPC) for fast mechanical and electric systems, electric drives, microelectromechanical systems (MEMS);

(b) Building blocks for solvers of integer optimization problems;

(c) Optimal filters (such as Kalman Filters) that are embedded in sensor circuitry;

(d) Fast analog decoding or encoding circuits;

(e) Linear Programming (LP) problems;

(f) Quadratic Programming (QP) problems; and (g) Image processing prior to analog to digital sampling.

The Optimizing Analog Circuit

Consider the optimization problem:

$$\min_{V=[V_1, \ldots, V_n]^T} \left(\frac{1}{2} V^T Q V + c^T V\right) \tag{1}$$

$$\text{s.t. } A_{eq} V = b_{eq} \tag{2}$$

$$A_{ineq} V \leq b_{ineq} \tag{3}$$

where $[V_1, \ldots, V_n]$ are the optimization variables, Q, $A_{ineq}$, and $A_{eq}$ are matrices, and c, $b_{eg}$ and $b_{ineq}$ are column vectors. The equality and inequality operators are element-wise operators. It should be parenthetically noted that Q is positive semidefinite. If Q is a zero matrix, then the optimization problem is a Linear Programming (LP) problem, otherwise it is a Quadratic Programming (QP) problem.

Without loss of generality, it is assumed that $A_{ineg}$, $A_{eq}$, and c have non-negative entries. Any LP described by Equations (1) through (3) can be transformed into this form by introducing an auxiliary vector $\overline{V}$ as follows:

$$\min_{\overline{V}, V} \left(\frac{1}{2} V^T Q V + c^T V\right) \tag{4}$$

$$\text{s.t. } A_{eq}^{+} V + A_{eq}^{-} \overline{V} = b_{eq} \tag{5}$$

$$A_{ineq}^{+} V + A_{ineq}^{-} \overline{V} \leq b_{ineq} \tag{6}$$

$$V + \overline{V} = 0 \tag{7}$$

where $A_{ineq}$, $A_{eq}$, and c are split into positive and negative parts ($A_{ineq}=A_{ineq}^{+}-A_{ineq}^{-}$, $A_{eq}=A_{eq}^{+}-A_{eq}^{-}$ and $c=c^{+}-c^{-}$).

Next in this section, the basic circuit building blocks are described that will be later used to create a circuit that solves a particular problem via an implementation of an optimization lattice. The first basic block enforces equality constraints of the form of Equation (5). The second building block enforces inequality constraints of the form of Equation (6). The penultimate basic block implements the cost function (here it is linear), and finally, the ultimate basic block implements Quadratic cost functions.

The Equality Constraint

Figure 1:
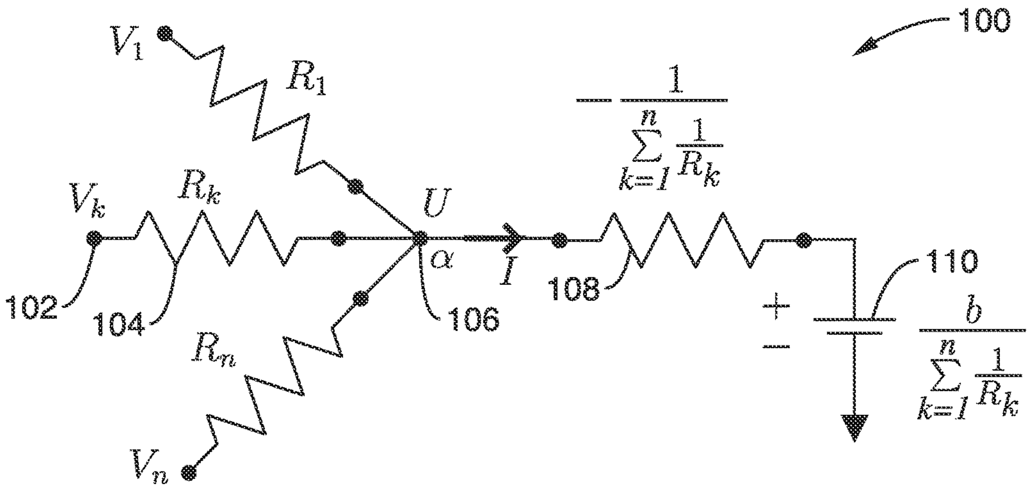
FIG. 1 is a schematic of an equality enforcing circuit comprising 11 resistors ($R_1, \ldots, R_n$), a negative resistance that has a value of $$-\frac{1}{\sum_{k=1}^{n}\frac{1}{R_k}},$$

Refer now to the circuit 100 of FIG. 1. $V_k$ is the potential of node k 102, and $R_k$ 104 is the resistance between node k 102 and the common node α 106 with potential U. The value $$-\frac{1}{\sum_{k=1}^{n}\frac{1}{R_k}} \quad 108$$

is a negative resistance, and $$\frac{b}{\sum_{k=1}^{n}\frac{1}{R_k}} \quad 110$$

is a voltage source.

For simplicity, just the single variable b has been used. However, b may also be known as $b_\alpha$, or the constraint corresponding to the common node α 106. Similarly, the voltage source U may also be known as $U_\alpha$, or the constraint voltage for the common node α 106.

Proposition 1 (Equality Constraint Circuit)

The circuit in FIG. 1 enforces the equality constraint:

$$\begin{bmatrix}\frac{1}{R_1} & \cdots & \frac{1}{R_n}\end{bmatrix}\begin{bmatrix}V_1\\ \vdots \\ V_n\end{bmatrix} = b. \tag{8}$$

Refer now to the circuit 200 depicted in FIG. 2. In this circuit, 11 conductors are connected to a common node α 202, which has a corresponding potential U. The current that exits node α 202 is termed I 204. Kirchhoff's current law (KCL) implies:

$$\sum_{k=1}^{n} I_k = \sum_{k=1}^{n}\frac{V_k - U}{R_k} = I \tag{9}$$

where $I_k$ 206 is the current through branch k 208, and $R_k$ 210 is the resistance between node k 212 and common node α 202. Equation (9) can be written as an equality constraint on potentials $V_k$:

$$\sum_{k=1}^{n}\frac{V_k}{R_k} = I + U\sum_{k=1}^{n}\frac{1}{R_k}. \tag{10}$$

If the right hand side (rhs) of Equation (10) is set to any desired value b, then Equation (10) enforces an equality constraint on a linear combination of $V_k$. The voltage U is set to:

$$U = -\frac{I}{\sum_{k=1}^{n}\frac{1}{R_k}} + \frac{b}{\sum_{k=1}^{n}\frac{1}{R_k}} \tag{11}$$

The rhs in Equation (11) may be implemented by a negative resistance of $$\frac{1}{\sum_{k=1}^{n}\frac{1}{R_k}}$$

(thereby forming the IR, or $$-\frac{I}{\sum_{k=1}^{n}\frac{1}{R_k}}$$

term of Equation (11) and a constant voltage source of magnitude $$\frac{b}{\sum_{k=1}^{n}\frac{1}{R_k}}.$$

Equation (11) taken together with Equation (10) yields the desired Equation (8). Therefore, the circuit shown in FIG. 1 successfully enforces the equality constraint of Equation (8).

The Inequality Constraint

Refer now to the circuit 300 of FIG. 3 for enforcing a set of inequality conditions. Similar to the equality constraint circuit previously described above in FIG. 1, n conductors are connected to a common node α 302. Common node α's potential is U and the current exiting this common node α 302 is I. An ideal diode 304 connects node α to node β. The potential of node β is taken to be U'. The ideal diode 304 enforces the requirement that potential U'≥U.

Finally, the common node α 302 output current I passes through the forward biased ideal diode 304, through a negative resistance of $$-\frac{1}{\sum_{k=1}^{n}\frac{1}{R_k}} \quad 306,$$

and then to a constant voltage source of $$\frac{b}{\sum_{k=1}^{n} \frac{1}{R_k}} 308.$$

As previously described in the section for equality constraints, for simplicity just the single variableb has been used. However, b may also be known as $b_\alpha$, or the constraint value for the common node α 302. Similarly, the voltage source U may also be known as $U_\alpha$, or the constraint voltage source 308 for the common node α 302.

Proposition 2 (Inequality Constraint Circuit)

The circuit in FIG. 3 enforces the inequality constraint:

$$\begin{bmatrix} \frac{1}{R_1} & \cdots & \frac{1}{R_n} \end{bmatrix} \begin{bmatrix} V_1 \\ \vdots \\ V_n \end{bmatrix} \leq b \tag{12}$$

Proof.

Kirchhoff's current law (KCL) implies Equation (9) as in the previous case. The ideal diode enforces U' U. In FIG. 3, the voltage U' at node β can be calculated as follows $$U' = \frac{b - I}{\sum_{k=1}^{n} \frac{1}{R_k}} \geq U. \tag{13}$$

Equation (9) and the condition that U≤U' yield:

$$\sum_{k=1}^{n} \frac{V_k}{R_k} = I + U\sum_{k=1}^{n} \frac{1}{R_k} \leq I + U'\sum_{k=1}^{n} \frac{1}{R_k} = b \tag{14}$$

which can be compactly rewritten as Equation (12). Therefore, the circuit shown in FIG. 3 enforces the inequality constraint of Equation (12).

It should be noted that the ideal diode 304 in FIG. 3 enforces:

$$I \geq 0 \tag{15}$$

$$I(U - U') = 0 \tag{16}$$

By using Equation (15) and rearranging its terms, Equation (16) can be rewritten as $$I\left(\left(\sum_{k=1}^{n} \frac{1}{R_k}\right)U - b + I\right) = 0 \tag{17}$$

This Equation (17) is useful for characterizing the analog optimization lattice electrical circuit in other contexts not described here.

The Linear Cost Function

Refer now to the circuit 400 in FIG. 4. In this circuit 400 the potential of common node α 402 is equal to $U_{cost}$ and the current that exits common node α 402 is $I_{cost}$ 404. From Equation (10), one obtains:

$$c^T V = I_{cost} + U_{cost}\sum_{k=1}^{n} \frac{1}{R_k} \square J \tag{18}$$

where $c=[1/R_1 \ldots 1/R_n]^T$, $V=[V_1 \ldots V_n]^T$ and J is the cost function. This part of the circuit implements the minimization of the cost function.

A thorough explanation of the cost circuit requires the equations of the entire LP circuit, is presented outside of this patent application. Here, a brief intuitive interpretation is presented.

It can be shown that the LP circuit is passive. This implies that when $U_{cost}$ is set to a low value, the voltages $V_k$ are driven in a direction that minimizes the current $I_{cost}$. Consequently, the cost, J is decreased by decreasing $U_{cost}$.

The Quadratic Cost Function

Refer now back to the circuit 300 of FIG. 3 for enforcing a set of inequality conditions. The quadratic cost function is a special case of an inequality enforcing circuit. If the inequality is redundant, meaning that the voltage 308 is very high, the diode 304 is always in a non-conducting state. Therefore, the circuit 300 is equivalent to each quadratic cost resistor $R_1 \ldots R_k \ldots R_n$ connected to the common node α 302.

Unlike the equality and inequality constraints, the quadratic cost function requires neither a voltage source nor a negative resistor. Unlike the inequality constraints, the quadratic cost resistor network also has the ideal diode removed. Therefore, in actual implementation, these additional components are not needed, and only the resistors are necessary.

However, for ease of description and limiting the complexity of the description in this invention, the quadratic cost functions may be more readily described as inequality constraints having a large positive voltage source.

A thorough explanation of the quadratic cost circuit requires the equations of the entire LP circuit, which will be presented outside of this patent application.

In short, where a quadratic cost is being used, the circuit 300 remains the same, except that: 1) the perfect diode 304, 2) negative resistor 306, and 3) constant voltage source 308 are all omitted.

The dissipation of energy from a resistor is proportional to a square of current through the resistor $E_{dissipated}=I^2R$. The current through a resistor is proportional to difference of voltages between the attached columns of common voltage conductors. The distribution of voltages minimizes power dissipation from resistors, according to the physics of current distribution. Therefore, the circuit dynamically settles into a minimum power dissipation state that corresponds by design to the required quadratic cost matrix Q.

Connecting the Basic Circuits

This section presents how to construct the electrical circuit that solves a general LP or QP problem. A conductance matrix $G \in \square^{(m+1)\times n}$ is constructed as:

$$G \square \begin{bmatrix} c^T \\ A \end{bmatrix} = \begin{bmatrix} c^T \\ A_{eq} \\ A_{ineq} \end{bmatrix} \tag{19}$$

and denotes $G_{ij}$ as the i, j element of G. For a given LP or QP problem, previously described by Equations (1) through (3), the $R_{ij}$ resistor is defined as:

$$R_{ij} \square \frac{1}{G_{ij}},\ i = 0, \ldots, m,\ J = 1, \ldots, n \tag{20}$$

where the first row of G (corresponding to $c^T$ or the cost function) is indexed by i=0. Additional cost functions may be added to the optmization lattice by indexing negatively on i, such as [−1, −2, −3, . . . ].

Refer now to the optimization lattice circuit 500 shown in FIG. 5. The circuit is shown using a compact notation where each resistor $R_{ij}$ is represented by a dot 502. Vertical conductors 504 represent variable nodes with potentials $V_1 \ldots V_n$, and horizontal conductors 506 represent constraint nodes. These conductors may be wires, with generally small resitances, or may be conductors in an LSI or VLSI integrated circuit, which may be implemented by metal or other similarly highly conductive material.

The circuit 500 of FIG. 5 may be most generally thought of as an optimization lattice that implements an optimization problem. As previously discussed, the horizontal conductors 506 represent constraints, and the vertical conductors 504 represent variables in the solution of the optimization problem.

Although provision is made for each horizontal conductor 506 to intersect with each vertical conductor 504 via a resistor, a resistor at each intersection is not necessary when the constraint or cost function is independent of particular variables. In such instances, the resistance is effectively infinite, with a corresponding conductance of zero: i.e. the resistance is omitted.

The optimization lattice is most generally presented as an implementation of a complete (m+1,n) array of conductances corresponding to the conductance matrix G previously discussed in Equation (19). However, it is understood that the optimization lattice may be populated with a number of zero conductance elements. Therefore, the lattice is taken as merely a generalization of the optimization problem, and not strictly limited to the population of each and every element with non-zero conductances.

The constraint nodes are illustrated here by equality constraints 508 and inequality constraints 510. There may be as many equality or inequality constraints as necessary to describe the particular LP problem. There may also be zero equality or inequality constraints for particular problems.

There is a cost function 512 that implements the LP problem cost (here indicated as a single row cost function), and quadratic cost resistors that implement the QP problem cost 514. The quadratic cost resistors are implemented in the optimization lattice with each row corresponding to one quadratic cost.

There may be zero to QR numbers of quadratic costs in a particular QP problem. In the case of a non-zero number of QR quadratic costs, the optimization lattice increases in size to accommodate a quadratic resistor subarray of:

$$\begin{matrix} R_{m+1,1} & \cdots & R_{m+1,n} \\ \vdots & \ddots & \vdots \\ R_{m+QR,1} & \cdots & R_{m+QR,n} \end{matrix} \tag{21}$$

with corresponding conductances of:

$$\begin{matrix} G_{m+1,1} & \cdots & G_{m+1,n} \\ \vdots & \ddots & \vdots \\ G_{m+QR,1} & \cdots & G_{m+QR,n} \end{matrix} \tag{22}$$

As previously discussed, the quadratic cost functions may also be implemented by simply setting an inequality constraint to have a large positive value voltage source. In this case, the subarrays would instead become part of the inequality constraints in the treatment above.

FIG. 6A depicts one of the resistor nodes 600 $R_{ij}=R_{i,j}$ 602 represented by a dot ● previously shown in FIG. 5. The compact representation of a resistor 604 through a dot ● symbol is clarified in FIG. 6B, where a resistance of magnitude $R_{ij}$ 606 interconnects a horizontal 608 $i^{th}$ row and vertical 610 $j^{th}$ column conductor. If $G_{ij}=0$, then no resistor (zero conductance) is needed to be present at the corresponding dot ●, thereby corresponding to an infinite resistance.

Referring back to FIG. 5, the LP circuit is constructed by connecting the nodes associated with the variables $V_1 \ldots V_n$ to all three types of the basic circuits: equality 508, inequality 510, and cost 512. Such nodes will be referred to as variable nodes. Each row of the circuit in FIG. 5 is one of the basic circuits presented above as equality constraints, inequality constraints, and a cost function. If $U_{cost}$ is "small enough", then the values of the potentials $V_1 \ldots V_n$ in this circuit are a solution of the Linear Programming problem described by Equation (1) throughEquation (3).

Note that one can easily change the rhs of equality constraints of Equation (8) or inequality constrains of Equation (12) to a different value $\bar{b}$ by simply using a voltage source equal to $$\bar{b}\sum_{k=1}^{n} \frac{1}{R_k}.$$

This allows one to solve parametric problems by simply changing the value of the external voltage sources.

The circuit as shown in FIG. 5 contains no time-varying dynamic elements such as capacitors or inductors. Therefore, the time required to reach steady-state is governed by the parasitic effects (e.g. conductor inductances and capacitances) and by the properties of the elements used to realize negative resistance (usually an operational amplifier) and perfect diode implementation. Hence, a good electronic design can achieve solution times on the order of these parasitic effects. Indeed, initial results of ongoing work on Very Large Scale Integration (VLSI) implementations indicate that time constants can be as low as a few nanoseconds.

Negative Resistance Implementation

Recall that in FIG. 5, each of the $R_j$, where $j \in (1, \ldots, m)$ are negative resistors. One must generally implement such negative resistances by using operational amplifiers in a feedback configuration.

Refer now to FIG. 7, which is a schematic 700 of one approximate implementation of a negative resistor. The negative resistance circuit shown in FIG. 7 is an operational amplifier implementation of a negative impedance converter. The two resistors R1 and the operational amplifier constitute a negative feedback non-inverting amplifier having a gain of A=2. The input resistance (for an ideal operational amplifier) is given by:

$$R_{in} \triangleq \frac{V}{i} = -R \tag{23}$$

Further analysis of the circuit is possible to account for limited gain bandwidth (GBW) products, as well as non-infinite operational amplifier input impedances.

In this implementation, the input port of the circuit can be connected into another network as if it were a negative resistance component.

Approximate Perfect Diode Implementation

Recall that in FIG. 5, for each of the inequality constraints 510, an ideal diode was required. One must generally implement such approximate ideal diodes by using operational amplifiers in a feedback configuration.

Refer now to FIG. 8A, which is a schematic 800 of one approximate implementation of a perfect diode. The near perfect diode circuit shown in FIG. 8A is an operational amplifier implementation of an ideal diode that uses negative feedback, a comparator, and a switch to approximate the behavior of the ideal diode.

Refer now to FIG. 8B, which shows the input-output relationship of the approximate ideal diode of FIG. 8A.

Simulations and Experiments

This section presents three examples where the approach proposed in this invention has been successfully applied. In the first example, a Quadratic Programming (QP) problem is solved by the disclosed modeling electrical circuit and simulated by the SPICE [Nagel and Pederson (1973)] simulator. In the second example, an analog Linear Programming (LP) problem is used to control a linear system by using Model Predictive Control (MPC). In the third and final example, an experiment is conducted by realizing the circuit for a small LP with standard electronic components.

Quadratic Programming (QP) Example QPCBLEND

Here, the method disclosed herein is demonstrated and its limits explored by solving the problem QPCBLEND from the Maros and Meszaros QP problem set [Maros and Meszaros (1999)]. The original problem has 83 variables, 43 equality constraints, and 114 inequality constraints. After translation to the all-positive form and the addition of constant variables (see above) the recast problem has 169 variables, 126 equality constraints, and 114 inequality constraints. The circuit that solves this problem was constructed with non-ideal components, including parasitic capacitances that roughly correspond to typical Very Large Scale Integration (VLSI) Complementary Metal Oxide Silicon (CMOS) analog design, and an operational amplifier with gain-bandwidth product (GBW) of 10 GHz.

Refer now to FIG. 9A through FIG. 9D, which detail the convergence of the electric circuit to the problem solution. The circuit converges to a solution that is slightly different from the optimum because non-ideal elements have been used. As can be seen in FIG. 9C and FIG. 9D, the steady-state error between the circuit cost and the optimal one $J_{opt}-J$ is of the order $10^{-3}$. Similarly the steady-state norm of the solution error $\|X_{opt}-X\|$ is of the order $10^{-3}$. There is a small constraint violation $\|AX-b\|^2=9.3\times10^{-4}$ since the operational amplifiers have finite gain and require non-zero violation to generate voltage. As expected, if higher gain (HG) operational amplifiers are used (with GBW products of ≥100 GHz), the infeasibility and the optimal cost errors decrease.

The circuit transient can be partitioned into two phases. During the first 1000 ns (or first 100 ns for the high gain circuit), rapid convergence to a solution close to optimal can be observed. Afterwards, the circuit continues to improve the solution with a smaller change in the cost value. This behavior suggests that there are two main circuit modes—fast modes are associated with components that move in the direction of the cost gradient, and slow modes are associated with voltages quasi-orthogonal to the cost gradient. The fast modes converge rapidly and provide a solution close to the optimum while the slow modes gradually improve the solution over a longer time period.

Model Predictive Controller (MPC) Example

This example demonstrates the implementation of a Model Predictive Controller (MPC) with an Linear Programming (LP) analog circuit model. For this example, the dynamical system $$\frac{dx}{dt} = -x + u$$

is used, where x is the system state and u is the input. It is desired that x follows a given reference trajectory while satisfying input constraints. The finite time optimal control problem at time t is formulated as:

$$\min_{u_0 \dots u_{n-1}} \sum_{i=1}^{N} |x(i) - x_{ref}(i)| \tag{24}$$

$$x_{i+1} = x_i + (u_i - x_i)\delta,\ i = 0, \dots , N \tag{25}$$

$$-1.5 \le u_i \le 1.5,\ i = 0, \dots , N \tag{26}$$

$$x_0 = x(t) \tag{27}$$

where N is the prediction horizon, $x_{ref}(i)$ is the reference trajectory at step i, δ is the sampling time, and x(t) is the initial state at time t. Only the first input, $u_0$, is applied at each time step t.

With N=16, the LP in Equations (24) through Equations (27) has 96 variables, 63 equality constraints, and 49 inequality constraints. Both an electric circuit that implements the system dynamics together with the circuit that implements the MPC controller were constructed and simulated using Simulation Program with Integrated Circuit Emphasis (SPICE). The voltage value representing the system state was measured and enforced on the $x_0$ node of the LP. The optimal input value $u_0$ was injected as input to the simulated system dynamics. Note that in this setup there is no sample and hold. Rather, the two circuits continuously interact with each other.

Refer now to FIG. 10, which is a graph 1000 that shows the closed loop SPICE simulations results. Note the predicted behavior of the closed loop control input and the satisfaction of the system constraints. Here, solid lines represent the nominal controller.

In order to demonstrate system performance for imperfect analog devices, another simulation result with 1% random Gaussian errors in the values of the resistors is presented on the same FIG. 10 via dashed lines. There appears to be no significant change in system behavior with the 1% random Gaussian errors.

Linear Programming (LP) Hardware Implementation Example

A small Linear Programming (LP) problem was implemented using standard electronics components. The same problem was realized by Hopfield [Tank and Hopfield (1986)] and Chua [Kennedy and Chua (1988)]. The LP problem is defined as follows:

$$\min_{x_1, x_2} c^T [x_1 x_2]^T \tag{28}$$

$$\text{s.t. } \frac{5}{12}x_1 - x_2 \le \frac{35}{12}, \frac{5}{2}x_1 + x_2 \le \frac{35}{2} \tag{29}$$

$$-x_1 \le 5, x_2 \le 5 \tag{30}$$

where c is a cost vector that is varied to get different solution points. The circuit was realized using resistors of 1% accuracy, operational amplifiers (OP27) for the negative resistance, and a comparator (LM311) with a switch (DG201) for implementing functionality of an ideal diode.

Various values for the cost function c and test results are summarized in Table 1. Table 1 shows that the experimental results are accurate up to 0.5%. The circuit reaches an equilibrium 6 μs after the cost voltage was applied. The convergence time is governed by a slew rate of the OP27 that is limited to 2.8 v/μs.

From the description herein, it will be appreciated that the invention can be embodied in various ways which include but are not limited to the following:

1. A method of solving an optimization problem with an analog circuit, the method comprising: (a) providing an optimization lattice comprising: (i) rows of common voltage conductors; (ii) columns of common voltage conductors; and (iii) a resistance $R_{ij}$ connected between row i and column j of the optimization lattice; (b) connecting one or more cost functions to corresponding cost function rows of the optimization lattice; (c) connecting zero or more equality constraints to the optimization lattice; (d) connecting zero or more inequality constraints to the optimization lattice; (e) providing voltage sources to each cost function, equality constraint, and inequality constraint; and (f) reading the voltages of the optimization lattice columns of common voltage conductors after the optimization lattice has reached steady state; (g) wherein the voltages of the optimization lattice columns of common voltage conductors form a solution vector to the optimization problem.

2. The method of any of the previous embodiments, wherein each cost function comprises a voltage supplied to a corresponding cost function row of the optimization lattice.

3. The method of any of the previous embodiments, wherein each equality constraint is a voltage supplied to one of the corresponding rows of the optimization lattice through a negative resistance.

4. The method of any of the previous embodiments: wherein each inequality constraint is a voltage supplied to one of the corresponding rows of the optimization lattice through a negative resistance, and then through an implementation of a perfect diode.

5. The method of any of the previous embodiments, wherein the negative resistance is implemented through an operational amplifier.

6. The method of any of the previous embodiments, wherein the negative resistance is implemented through an operational amplifier.

7. The method of any of the previous embodiments, wherein the perfect diode is implemented through an operational amplifier.

8. The method of any of the previous embodiments, wherein the resistances $R_{ij}$ connected between row i and column j of the optimization lattice, when inverted, form elements of a conductance matrix G; wherein element $G_{ij}$ is the i, j element of G; wherein i∈(0, . . . , m); wherein j∈(1, . . . , n); and $$G_{ij} = \frac{1}{R_{ij}};$$

wherein m is the sum of the number of equality constraints plus the number of inequality constraints.

9. The method of any of the previous embodiments, wherein the optimization problem is selected from a group of optimization problems consisting of: Linear Programming (LP) problems, and Quadratic Programming (QP) problems.

10. The method of any of the previous embodiments, wherein absent all resistances $R_{ij}$ connected between row i and column j of the optimization lattice, each row and column of common voltage conductors in the optimization lattice are electrically isolated.

11. The method of any of the previous embodiments, wherein each constraint negative resistance for a particular row α is calculated as $$-\frac{1}{\sum_{k=1}^{n} \frac{1}{R_k}},$$

where $R_k = 1/G_{\alpha k}$.

12. The method of any of the previous embodiments, wherein each constraint voltage source for a particular row α is calculated as $$\frac{b_\alpha}{\sum_{k=1}^{n} \frac{1}{R_k}},$$

where $R_k = 1/G_{\alpha k}$ and $b_\alpha$ is the corresponding constraint value for row α.

13. The method of any of the previous embodiments, further comprising: changing one or more of the voltage sources to the cost functions, the equality constraints, or the inequality constraints without otherwise changing the optimization lattice; and then re-reading the voltages of the optimization lattice columns of common voltage conductors after the optimization lattice has reached steady state.

14. A method of solving an optimization problem with an analog circuit, the method comprising: (a) providing an optimization problem of the form:

$$\min_{V=[V_1, \ldots, V_n]^T} (c^T V) \text{ s.t. } A_{eq} V = b_{eq}, A_{ineq} V \le b_{ineq} \tag{b}$$

recasting the optimization problem so that $A_{ineq}$, $A_{eq}$, and c have non-negative entries; and (c) modeling the recast optimization problem in an optimization lattice; and (d) wherein $V=[V_1, \ldots, V_n]^T$ are solution voltages.

15. An analog circuit for solving an optimization problem, comprising: (a) an optimization lattice comprising (i) rows of common voltage conductors; (ii) columns of common voltage conductors; and (iii) a resistance $R_{ij}$ connected between row i and column j of the optimization lattice; (b) one or more cost functions connected to corresponding cost function rows of the optimization lattice; (c) zero or more equality constraints connected to the optimization lattice; (d) zero or more inequality constraints connected to the optimization lattice; (e) voltage sources connected to the cost functions, the equality constraints, the inequality constraints; and (f) output voltages of optimization lattice columns of common voltage conductors after the optimization lattice has reached steady state; (g) wherein the output voltages of the optimization lattice columns of common voltage conductors form a solution vector to an optimization problem.

16. The analog circuit of any of the previous embodiments, wherein each cost function comprises a voltage supplied to a corresponding cost function row of the optimization lattice.

17. The analog circuit of any of the previous embodiments, wherein each equality constraint is a voltage supplied to one of the corresponding rows of the optimization lattice through a negative resistance.

18. The analog circuit of any of the previous embodiments, wherein each inequality constraint is a voltage supplied to one of the corresponding rows of the optimization lattice through a negative resistance, and then through an implementation of a perfect diode.

19. The analog circuit of any of the previous embodiments, wherein the negative resistance is implemented through an operational amplifier.

20. The analog circuit of any of the previous embodiments, wherein the negative resistance is implemented through an operational amplifier.

21. The analog circuit of any of the previous embodiments, wherein the perfect diode is implemented through one or more devices selected from a group of devices consisting of: an operational amplifier, a comparator, a switch, and a Field Effect Transistor (FET).

22. The analog circuit of any of the previous embodiments, wherein the resistances $R_{ij}$ connected between row i and column j of the optimization lattice, when inverted, form elements of a conductance matrix G; (a) wherein element $G_{ij}$ is the i, j element of G; (b) wherein $i \in (0, \ldots, m)$; (c) wherein $j \in (1, \ldots, n)$; and (d)

$$G_{ij} = \frac{1}{R_{ij}}; \quad \text{(e)}$$

wherein m is the sum of the number of equality constraints plus the number of inequality constraints.

23. The analog circuit of any of the previous embodiments, wherein the optimization problem is selected from a group of optimization problems consisting of: Linear Programming (LP) problems, and Model Predictive Control (MPC) problems.

24. The analog circuit of any of the previous embodiments, wherein absent all resistances $R_{ij}$ connected between row i and column j of the optimization lattice, each row and column of common voltage conductors in the optimization lattice are electrically isolated.

25. The analog circuit of any of the previous embodiments, wherein each constraint negative resistance for a particular row $\alpha$ has a value of $$-\frac{1}{\sum_{k=1}^{n} \frac{1}{R_k}},$$

where $R_k = 1/G_{\alpha k}$.

26. The analog circuit of any of the previous embodiments, wherein each constraint voltage source for a particular row $\alpha$ has a value of $$\frac{b_\alpha}{\sum_{k=1}^{n} \frac{1}{R_k}},$$

where $R_k = 1/G_{\alpha k}$ and $b_\alpha$ is the corresponding constraint value for row $\alpha$.

27. The analog circuit of any of the previous embodiments, wherein one or more of the voltage sources supplied to corresponding cost functions, equality constraints, or inequality constraints may be changed without otherwise changing the optimization lattice.

28. A method of solving an optimization problem with an analog circuit, the method comprising: (a) providing an optimization lattice comprising: (i) rows of common voltage conductors; (ii) columns of common voltage conductors; and (iii) a resistance $R_{ij}$ connected between row i and column j of the optimization lattice; (b) connecting zero or more cost functions to corresponding cost function rows of the optimization lattice; (c) connecting zero or more equality constraints to the optimization lattice; (d) connecting zero or more inequality constraints to the optimization lattice; (e) providing voltage sources to each cost function, equality constraint, and inequality constraint; and (f) reading the voltages of the optimization lattice columns of common voltage conductors after the optimization lattice has reached steady state; (g) wherein the voltages of the optimization lattice columns of common voltage conductors form a solution vector to the optimization problem.

29. The method of solving the optimization problem with the analog circuit of embodiment 28, further comprising: (a) connecting one or more quadratic cost functions to the optimization lattice; (b) wherein each quadratic cost function comprises one or more quadratic cost resistors connected from (i) a corresponding quadratic cost function row to (ii) one of the columns of common voltage conductors of the optimization lattice.

30. The method of solving the optimization problem with the analog circuit of any of embodiments 28 through 29, wherein each cost function comprises a voltage supplied to a corresponding cost function row of the optimization lattice.

31. The method of solving the optimization problem with the analog circuit of any of embodiments 28 through 30, wherein each equality constraint is a voltage supplied to one of the corresponding rows of the optimization lattice through a negative resistance.

32. The method of solving the optimization problem with the analog circuit of any of embodiments 28 through 31, wherein each inequality constraint is a voltage supplied to one of the corresponding rows of the optimization lattice through a negative resistance, and then through an implementation of a perfect diode.

33. The method of solving the optimization problem with the analog circuit of any of embodiments 28 through 32, wherein the negative resistance is implemented through an operational amplifier.

34. The method of solving the optimization problem with the analog circuit of any of embodiments 28 through 33, wherein the perfect diode is implemented through an operational amplifier.

35. The method of solving the optimization problem with the analog circuit of embodiments 28 through 34, wherein the resistances $R_{ij}$ connected between row i and column j of the optimization lattice, when inverted, form elements of a conductance matrix G; wherein element $G_{ij}$ is the i, j element of G; wherein i∈(0, . . . , m); wherein j∈(1, . . . , n); wherein $$G_{ij} = \frac{1}{R_{ij}};$$

and wherein m is the sum of the number of equality constraints plus the number of inequality constraints.

36. The method of solving the optimization problem with the analog circuit of any of embodiments 28 through 35, wherein the optimization problem is selected from a group of optimization problems consisting of: Linear Programming (LP) problems, and Quadratic Programming (QP) problems.

37. The method of solving the optimization problem with the analog circuit of any of embodiments 28 through 36, wherein absent all resistances $R_{ij}$ connected between row i and column j of the optimization lattice, each row and column of common voltage conductors in the optimization lattice are electrically isolated.

38. The method of solving the optimization problem with the analog circuit of any of embodiments 28 through 37, wherein each constraint negative resistance for a particular row α is calculated as $$-\frac{1}{\sum_{k=1}^{n} \frac{1}{R_k}},$$

where $R_k = 1/G_{\alpha k}$.

39. The method of solving the optimization problem with the analog circuit of any of embodiments 28 through 38, wherein each constraint voltage source for a particular row α is calculated as $$\frac{b_\alpha}{\sum_{k=1}^{n} \frac{1}{R_k}},$$

where $R_k = 1/G_{\alpha k}$ and $b_\alpha$ is the corresponding constraint value for row α.

40. The method of solving the optimization problem with the analog circuit of any of embodiments 28 through 39, further comprising: changing one or more of the voltage sources to the cost functions, the equality constraints, or the inequality constraints without otherwise changing the optimization lattice; and then re-reading the voltages of the optimization lattice columns of common voltage conductors after the optimization lattice has reached steady state.

41. A method of solving an optimization problem with an analog circuit, the method comprising: (a) providing an optimization problem of the form $$\min_{V=[V_1,\ldots,V_n]^T} \left(\frac{1}{2} V^T Q V + c^T V\right)$$
$$\text{s.t. } A_{eq} V = b_{eq}$$
$$A_{ineq} V \le b_{ineq};$$

(b) recasting the optimization problem so that $A_{ineq}$, $A_{eq}$, and c have non-negative entries; and (c) modeling the recast optimization problem in an optimization lattice; (d) wherein $V=[V_1, \ldots, V_n]^T$ are solution voltages; (e) wherein Q is a matrix where each non-zero entry represents a quadratic cost resistor that forms one or more quadratic cost functions to the optimization lattice; and (f) wherein each quadratic cost function comprises one or more of the quadratic cost resistors connected from a corresponding quadratic cost function row to one of the columns of common voltage conductors of the optimization lattice.

42. An analog circuit for solving an optimization problem, comprising: (a) an optimization lattice comprising: (i) rows of common voltage conductors; (ii) columns of common voltage conductors; and (iii) a resistance $R_{ij}$ connected between row i and column j of the optimization lattice; (b) zero or more cost functions connected to corresponding cost function rows of the optimization lattice; (c) zero or more equality constraints connected to the optimization lattice; (d) zero or more inequality constraints connected to the optimization lattice; (e) voltage sources connected to the cost functions, the equality constraints, the inequality constraints; and (f) output voltages of optimization lattice columns of common voltage conductors after the optimization lattice has reached steady state; (g) wherein the output voltages of the optimization lattice columns of common voltage conductors form a solution vector to an optimization problem.

43. The analog circuit of embodiment 42, further comprising: (a) one or more quadratic cost functions connected to the optimization lattice; (b) wherein each quadratic cost function comprises one or more quadratic cost resistors connected from a corresponding quadratic cost function row to one of the columns of common voltage conductors of the optimization lattice.

44. The analog circuit of any of embodiments 42 through 43, wherein each cost function comprises a voltage supplied to a corresponding cost function row of the optimization lattice.

45. The analog circuit of any of embodiments 42 through 44, wherein each equality constraint is a voltage supplied to one of the corresponding rows of the optimization lattice through a negative resistance.

46. The analog circuit of any of embodiments 42 through 45, wherein each inequality constraint is a voltage supplied to one of the corresponding rows of the optimization lattice through a negative resistance, and then through an implementation of a perfect diode.

47. The analog circuit of any of embodiments 42 through 46, wherein the negative resistance is implemented through an operational amplifier.

48. The analog circuit of any of embodiments 42 through 47, wherein the perfect diode is implemented through one or more devices selected from a group of devices consisting of: an operational amplifier, a comparator, a switch, and a Field Effect Transistor (FET).

49. The analog circuit of any of embodiments 42 through 48, wherein the resistances $R_{ij}$ connected between row i and column j of the optimization lattice, when inverted, form elements of a conductance matrix G; wherein element $G_{ij}$ is the i, j element of G; wherein i∈(0, . . . , m); wherein j∈(1, . . . , n); wherein $$G_{ij} = \frac{1}{R_{ij}};$$

and wherein m is the sum of the number of equality constraints plus the number of inequality constraints.

50. The analog circuit of any of embodiments 42 through 49, wherein the optimization problem is selected from a group of optimization problems consisting of: Linear Programming (LP) problems, and Quadratic Programming (QP) problems.

51. The analog circuit of any of embodiments 42 through 50, wherein absent all resistances $R_{ij}$ connected between row i and column j of the optimization lattice, each row and column of common voltage conductors in the optimization lattice are electrically isolated.

52. The analog circuit of any of embodiments 42 through 51, wherein each constraint negative resistance for a particular row α has a value of $$-\frac{1}{\sum_{k=1}^{n} \frac{1}{R_k}},$$

where $R_k=1/G_{\alpha k}$.

53. The analog circuit of any of embodiments 42 through 52, wherein each constraint voltage source for a particular row α has a value of $$\frac{b_\alpha}{\sum_{k=1}^{n} \frac{1}{R_k}},$$

where $R_k=1/G_{\alpha k}$ and $b_\alpha$ is the corresponding constraint value for row α.

54. The analog circuit of any of embodiments 42 through 53, wherein one or more of the voltage sources supplied to corresponding cost functions, equality constraints, or inequality constraints may be changed without otherwise changing the optimization lattice.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for".

No claim element herein is to be construed as a "step plus function" element unless the element is expressly recited using the phrase "step for".

TABLE 1

Experimental and theoretical results for an LP solution.

| cost direction | x1 simulated | x1 exact | x2 simulated | x2 exact |
|---|---|---|---|---|
| 1 | 4.996 | 5.000 | 4.990 | 5.000 |
| −1 1 | 7.002 | 7.000 | 5.005 | 5.000 |
| −2 | −7.012 | −7.000 | −4.980 | −5.000 |
| 0 | 6.976 | 7.000 | 0.005 | 0.000 |

What is claimed is:

1. A method of solving an optimization problem with an analog circuit, the method comprising:

(a) providing an optimization lattice comprising:

(i) rows of common voltage conductors;

(ii) columns of common voltage conductors; and (iii) a resistance $R_{ij}$ connected between row i and column j of the optimization lattice;

(b) connecting one or more cost functions to corresponding cost function rows of the optimization lattice;

(c) connecting zero or more equality constraints to the optimization lattice;

(d) connecting zero or more inequality constraints to the optimization lattice;

(e) providing voltage sources to each cost function, equality constraint, and inequality constraint; and (f) reading voltages from the columns of common voltage conductors of the optimization lattice after the optimization lattice has reached steady state;

(g) wherein the voltages of the optimization lattice columns of common voltage conductors form a solution vector to the optimization problem; and (h) wherein each cost function comprises a voltage supplied to a corresponding cost function row of the optimization lattice;

(i) wherein each equality constraint is a voltage supplied to a corresponding row in the rows of common voltage conductors of the optimization lattice through a negative resistance; and (j) wherein the negative resistance is implemented through an operational amplifier.

2. The method of claim 1:

wherein each inequality constraint is a voltage supplied to a corresponding row in the rows of common voltage conductors of the optimization lattice through a negative resistance, and then through an implementation of a perfect diode.

3. The method of claim 2, wherein the negative resistance is implemented through an operational amplifier.

4. The method of claim 2, wherein the perfect diode is implemented through an operational amplifier.

5. The of claim 1, wherein the resistances $R_{ij}$ connected between row i and column j of the optimization lattice, when inverted, form elements of a conductance matrix G;

(a) wherein element $G_{ij}$ is the i, j element of G;

(b) wherein $i \in (0, \ldots, m)$;

(c) wherein $j \in (1, \ldots, n)$; and (d)

$$G_{ij} = \frac{1}{R_{ij}};$$

(e) wherein m is a sum of a number of equality constraints plus a number of inequality constraints.

6. The method of claim 1, wherein the optimization problem is selected from a group of optimization problems consisting of: Linear Programming (LP) problems, and Quadratic Programming (QP) problems.

7. The method of claim 1, wherein absent all resistances $R_{ij}$ connected between row i and column j of the optimization lattice, each row and column of common voltage conductors in the optimization lattice are electrically isolated.

8. The method of claim 1, wherein each constraint negative resistance for a particular row α is calculated as $$-\frac{1}{\sum_{k=1}^{n} \frac{1}{R_k}},$$

where $R_k = 1/G_{\alpha k}$.

9. The method of claim 1, wherein each constraint voltage source for a particular row α is calculated as $$\frac{b_\alpha}{\sum_{k=1}^{n} \frac{1}{R_k}},$$

where $R_k = 1/G_{\alpha k}$ and $b_\alpha$ is a corresponding constraint value for row α.

10. The method of claim 1, further comprising:

changing one or more of the voltage sources to the cost functions, the equality constraints, or the inequality constraints without otherwise changing the optimization lattice; and then re-reading voltages from the optimization lattice columns of common voltage conductors after the optimization lattice has reached steady state.

11. The method of claim 1:

(a) wherein the optimization problem is of the form:

$$\min_{V=[V_1, \ldots, V_n]^T} (c^T V)$$
$$\text{s.t. } A_{eq} V = b_{eq}$$
$$A_{ineq} V \le b_{ineq};$$

(b) wherein a recasting of the optimization problem is performed so that $A_{ineq}$, $A_{eq}$, and C have non-negative entries; and (c) modeling the recast optimization problem in into the optimization lattice; and (d) wherein $V = [V_1, \ldots, V_n]^T$ are generated as solution voltages.

12. An analog circuit for solving an optimization problem, comprising:

(a) an optimization lattice comprising:

(i) rows of common voltage conductors;

(ii) columns of common voltage conductors; and (iii) a resistance $R_{ij}$ connected between row i and column j of the optimization lattice;

(b) one or more cost functions connected to corresponding cost function rows of the optimization lattice;

(c) zero or more equality constraints connected to the optimization lattice;

(d) zero or more inequality constraints connected to the optimization lattice;

(e) voltage sources connected to the cost functions, the equality constraints, the inequality constraints;

(f) output voltages of optimization lattice columns of common voltage conductors after the optimization lattice has reached steady state;

(g) wherein the output voltages of the optimization lattice columns of common voltage conductors form a solution vector to an optimization problem:, (h) wherein each cost function comprises a voltage supplied to a corresponding cost function row of the optimization lattice;

(i) wherein each equality constraint is a voltage supplied to a corresponding row of common voltage conductors of the optimization lattice through a negative resistance;

(j) wherein each inequality constraint is a voltage supplied to a corresponding row of common voltage conductors of the optimization lattice through a negative resistance, and then through an implementation of a perfect diode; and (k) wherein the negative resistance is implemented through an operational amplifier.

13. The analog circuit of claim 12, wherein each cost function comprises a voltage supplied to a corresponding cost function row of the optimization lattice.

14. The analog circuit of claim 12, wherein the perfect diode is implemented through one or more devices selected from a group of devices consisting of: an operational amplifier, a comparator, a switch, and a Field Effect Transistor (FET).

15. The analog circuit of claim 12, wherein the resistances $R_{ij}$ connected between row i and column j of the optimization lattice, when inverted, form elements of a conductance matrix G;

(a) wherein element $G_{ij}$ is the i, j element of G;

(b) wherein $i \in (0, \ldots, m)$;

(c) wherein $j \in (1, \ldots, n)$; and (d)

$$G_{ij} = \frac{1}{R_{ij}};$$

(e) wherein m is a sum of a number of equality constraints plus a number of inequality constraints.

16. The analog circuit of claim 12, wherein the optimization problem is selected from a group of optimization problems consisting of: Linear Programming (LP) problems, and Model Predictive Control (MPC) problems.

17. The analog circuit of claim 12, wherein absent all resistances $R_{ij}$ connected between row i and column j of the optimization lattice, each row and column of common voltage conductors in the optimization lattice are electrically isolated.

18. The analog circuit of claim 12, wherein each constraint negative resistance for a particular row α has a value of $$-\frac{1}{\sum_{k=1}^{n} \frac{1}{R_k}},$$

where $R_k = 1/G_{\alpha k}$.

19. The analog circuit of claim 12, wherein each constraint voltage source for a particular row α has a value of $$\frac{b_\alpha}{\sum_{k=1}^{n} \frac{1}{R_k}},$$

where $R_k = 1/G_{\alpha k}$ and $b_\alpha$ is a corresponding constraint value for row α.

20. The analog circuit of claim 12, wherein one or more of the voltage sources supplied to corresponding cost functions, equality constraints, or inequality constraints may be changed without otherwise changing the optimization lattice.

* * * * *